United States Patent
Sho et al.

(10) Patent No.: US 10,250,170 B2
(45) Date of Patent: Apr. 2, 2019

(54) MOTOR CONTROL DEVICE

(71) Applicant: Mitsubishi Electric Corporation, Chiyoda-ku (JP)

(72) Inventors: Sayaka Sho, Tokyo (JP); Jun Hattori, Tokyo (JP); Atsuo Haishi, Tokyo (JP); Masaya Harakawa, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/565,237

(22) PCT Filed: Aug. 24, 2016

(86) PCT No.: PCT/JP2016/074642
§ 371 (c)(1),
(2) Date: Oct. 9, 2017

(87) PCT Pub. No.: WO2018/037500
PCT Pub. Date: Mar. 1, 2018

(65) Prior Publication Data
US 2018/0309393 A1 Oct. 25, 2018

(51) Int. Cl.
*H02P 5/46* (2006.01)
*H02P 6/04* (2016.01)
(Continued)

(52) U.S. Cl.
CPC .................. *H02P 5/46* (2013.01); *H02P 6/04* (2013.01); *B29C 45/76* (2013.01); *B29C 2045/1792* (2013.01)

(58) Field of Classification Search
CPC .. H02P 6/16; H02P 21/32; H02P 23/18; H02P 5/46
See application file for complete search history.

(56) References Cited

U.S. PATENT DOCUMENTS 5,175,680 A 12/1992 Yoneda et al.
6,046,566 A 4/2000 Sonoda et al.
(Continued)

FOREIGN PATENT DOCUMENTS

JP 2-241392 A 9/1990
JP 10-255780 A 9/1998
(Continued)

OTHER PUBLICATIONS

International Search Report dated Nov. 22, 2016, in PCT/JP2016/074642, filed Aug. 24, 2016 (with English translation of categories of cited documents).
(Continued)

*Primary Examiner* — Thai T Dinh
(74) *Attorney, Agent, or Firm* — Oblon, McClelland, Maier & Neustadt, L.L.P.

(57) ABSTRACT

A motor control device includes a master-shaft drive device to drive a master-shaft motor, and a slave-shaft drive device to drive a slave-shaft motor, the motor control device including a correction-amount calculation unit to use a detection result of a position of the master-shaft motor and a detection result of a position of the slave-shaft motor to calculate a correction amount for correcting a speed command that is to be used for controlling the master-shaft motor, a correction unit to use the correction amount to correct the speed command that is to be used for controlling the master-shaft motor, and a position control unit to execute position control on the slave-shaft motor by using the detection result of the position of the master-shaft motor as a position command.

5 Claims, 9 Drawing Sheets

(51) Int. Cl.
*B29C 45/76* (2006.01)
*B29C 45/17* (2006.01)

(56) References Cited

U.S. PATENT DOCUMENTS

| | | | |
|---|---|---|---|
| 6,823,235 B2 | 11/2004 | Toyozawa et al. | |
| 7,183,739 B2 | 2/2007 | Iwashita et al. | |
| 7,456,599 B2* | 11/2008 | Piefer | B41F 13/004 318/41 |
| 7,656,106 B2* | 2/2010 | Iwashita | G05B 19/195 318/39 |
| 8,058,827 B2* | 11/2011 | Iwashita | H02P 23/14 173/176 |
| 8,244,385 B2 | 8/2012 | Takagi | |
| 8,587,247 B2 | 11/2013 | Yoshiura et al. | |
| 9,041,336 B2* | 5/2015 | Hosek | H02P 6/10 318/560 |
| 9,876,448 B2* | 1/2018 | Eguchi | H02P 5/50 |
| 2005/0168178 A1* | 8/2005 | Toyozawa | G05B 19/186 318/68 |
| 2006/0186845 A1* | 8/2006 | Terada | G05B 19/19 318/432 |
| 2008/0218116 A1* | 9/2008 | Maeda | G05B 19/19 318/571 |
| 2010/0231158 A1* | 9/2010 | Jonsson | G05B 19/258 318/609 |
| 2016/0252896 A1* | 9/2016 | Nakamura | G05B 11/011 318/611 |

FOREIGN PATENT DOCUMENTS

| | | |
|---|---|---|
| JP | 11-305839 A | 11/1999 |
| JP | 2002-326140 A | 11/2002 |
| JP | 2003-200332 A | 7/2003 |
| JP | 3556897 B2 | 8/2004 |
| JP | 3582722 B2 | 10/2004 |
| JP | 2005-176493 A | 6/2005 |
| JP | 2006-190074 A | 7/2006 |
| JP | 3853650 B2 | 12/2006 |
| JP | 3923047 B2 | 5/2007 |
| JP | 3976161 B2 | 9/2007 |
| JP | 2008-225533 A | 9/2008 |
| JP | 2008-289312 A | 11/2008 |
| JP | 4325761 B1 | 9/2009 |
| JP | 4361071 B2 | 11/2009 |
| JP | 2010-22145 A | 1/2010 |
| JP | 5013607 B2 | 8/2012 |
| JP | 5235707 B2 | 7/2013 |
| JP | 5429576 B2 | 2/2014 |
| JP | 2015-120302 A | 7/2015 |

OTHER PUBLICATIONS

Decision to Grant a Patent (with English translation) dated Apr. 11, 2017, in Japanese Patent Application No. 2017-512056.

* cited by examiner

MOTOR CONTROL DEVICE

FIELD

The present invention relates to a motor control device that controls a plurality of motors.

BACKGROUND

Mechanical devices, such as an injection molding machine, often include two or more drive shafts, and use motors that correspond one-to-one to the two or more drive shafts to drive a single mechanically-controlled device. In such a mechanical device that includes the two or more drive shafts, that is, the multiple drive shafts, one of the multiple drive shafts serves as a master shaft while the other shafts serve as slave shafts. Since all the drive shafts drive the same controlled device, the master shaft and the slave shafts are required to synchronize their speeds and positions.

A technique for achieving the synchronized speed operation between the master shaft and the slave shafts includes a method of providing an identical command value to the master shaft and the slave shafts. Unfortunately, even when the identical command value is provided to the master shaft and the slave shafts, a difference in the rotational speed or the position between the master shaft and the slave shafts may occur due to, for example, the variation in characteristics between the motors corresponding to the respective drive shafts, or a disturbance torque. If such a difference in the rotational speed or the position between the drive shafts occurs, the synchronous control cannot be achieved. Patent Literature 1 discloses an example of the technique for achieving the synchronous control in spite of the difference as described above.

Patent Literature 1 discloses a synchronous control device that detects a workpiece conveyance speed that is a rotational speed of a master shaft, and a rotational speed of a seam electrode that is a rotational speed of a slave shaft. On the basis of the difference between the workpiece conveyance speed and the rotational speed of the seam electrode, the rotational speed of the seam electrode is brought into synchronization with the workpiece conveyance speed. The synchronous control device of Patent Literature 1, which uses the difference between the actually detected speeds to execute the synchronous control, achieves the synchronization even in the presence of the variation in the motor characteristics between the master shaft and the slave shaft, or the disturbance torque.

CITATION LIST

Patent Literature

Patent Literature 1: Japanese Patent Application Laid-open No. H10-255780

SUMMARY

Technical Problem

In the synchronous control device described in Patent Literature 1, the slave-shaft-side control system executes the synchronous control by using the aforementioned speed difference. For this reason, the synchronous control device described in Patent Literature 1 can achieve the synchronous control as long as the motors corresponding to the respective drive shafts operate within an allowable torque range. At least one of the motor corresponding to the master shaft and the motor corresponding to the slave shaft is often required to perform a high-torque operation so that a torque saturation with the torque exceeding an upper-limit value of the allowable torque occurs. During the high-torque operation, the slave shaft can still follow the operation of the master shaft, thus maintaining the synchronization between the master shaft and the slave shaft provided that the torque saturation occurs in the motor corresponding to the master shaft while the torque saturation does not occur in the motor corresponding to the slave shaft. During the high-torque operation, however, the slave shaft fails to follow the operation of the master shaft provided that the torque saturation does not occur in the motor corresponding to the master shaft while the torque saturation occurs in the motor corresponding to the slave shaft. As a result, the synchronization between the master shaft and the slave shaft is not maintained.

The present invention has been achieved to solve the above problems, and an object of the present invention is to provide a motor control device that can maintain the synchronization between drive shafts even during the high-torque operation.

Solution to Problem

In order to solve the above problems and achieve the object, a motor control device according to the present invention includes a first drive device to drive a first motor, and a second drive device to drive a second motor. The motor control device according to the present invention includes a correction-amount calculation unit to use a detection result of a position of the first motor and a detection result of a position of the second motor to calculate a correction amount for correcting a command that is to be used for controlling the first motor, and a correction unit to correct the command that is to be used for controlling the first motor by using the correction amount. Further, the motor control device according to the present invention includes a position control unit to execute position control on the second motor by using the detection result of the position of the first motor as a position command.

Advantageous Effects of Invention

The motor control device according to the present invention has an effect where synchronization between drive shafts can be maintained even during a high-torque operation.

DESCRIPTION OF EMBODIMENTS

A motor control device according to embodiments of the present invention will be described in detail below based on the drawings. The present invention is not limited to the embodiments.

First Embodiment.

Figure 1:
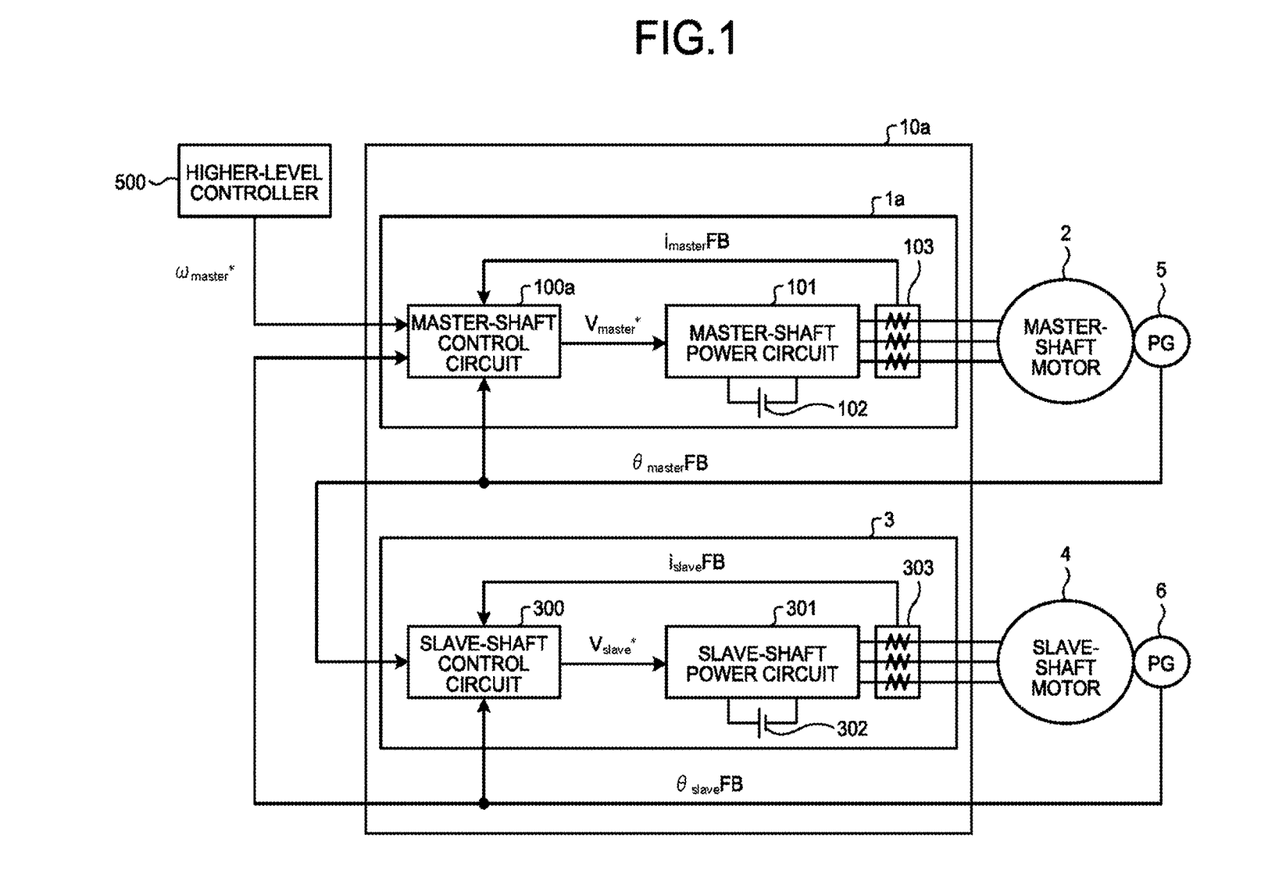
FIG. 1 is a diagram illustrating a configuration example of a motor control device according to a first embodiment.

FIG. 1 is a diagram illustrating a configuration example of a motor control device according to a first embodiment of the present invention. A motor control device 10a illustrated in FIG. 1 is used in an apparatus that includes two drive shafts, which are a master shaft and a slave shaft. In FIG. 1, a master-shaft motor 2 and a slave-shaft motor 4, both of which are driven by the motor control device 10a, are also illustrated along with the motor control device 10a. The master shaft is a drive shaft of the master-shaft motor 2 that is a first motor. The slave shaft is a drive shaft of the slave-shaft motor 4 that is a second motor.

In FIG. 1, a PG (Pulse Generator) 5, a PG 6, and a higher-level controller 500 are further illustrated along with the motor control device 10a. The PG 5 detects the position of the master-shaft motor 2, that is, the PG detects the rotational angle of the master-shaft motor 2. The PG 6 detects the position of the slave-shaft motor 4, that is, the PG 6 detects the rotational angle of the slave-shaft motor 4. The higher-level controller 500 outputs a master-shaft speed command $\omega_{master}^*$, which is a speed command for the master shaft, to the motor control device 10a. The PG 5 and the PG 6 are also called "encoder", which are detectors that detect the rotational angle of the respective motors. The PG 5 outputs the detection result of the position of the master-shaft motor 2 to a master-shaft control circuit 100a, as feedback information $\theta_{master}$FB on the position of the master-shaft motor 2. The PG 6 outputs the detection result of the position of the slave-shaft motor 4 to a slave-shaft control circuit 300, as feedback information $\theta_{slave}$FB on the position of the slave-shaft motor 4. FIG. 1 illustrates an example in which the PG 5 and the PG 6 are not included in the motor control device 10a. However, the PG 5 and the PG 6 may be defined as constituent elements of the motor control device 10a.

The motor control device 10a includes a master-shaft drive device 1a that drives the master-shaft motor 2, and a slave-shaft drive device 3 that drives the slave-shaft motor 4. The master-shaft drive device 1a is a first drive device that drives the first motor. The slave-shaft drive device 3 is a second drive device that drives the second motor. The master-shaft drive device 1a includes the master-shaft control circuit 100a, a master-shaft power circuit 101, a power supply 102, and a current detector 103.

The master-shaft control circuit 100a uses feedback information $i_{master}$FB on a current that flows through the master shaft described later, $\theta_{master}$FB, $\theta_{slave}$FB and the master-shaft speed command $\omega_{master}^*$ received from the higher-level controller 500 to calculate a voltage command $V_{master}^*$ for the voltage to be output to the master-shaft motor 2. The master-shaft power circuit 101 converts DC power supplied from the power supply 102, to AC power, and outputs the AC power to the master-shaft motor 2. The current detector 103 detects a current that flows through the master-shaft motor 2, and outputs information indicating the detection result to the master-shaft control circuit 100a, as feedback information $i_{master}$FB on the current that flows through the master shaft.

The slave-shaft drive device 3 includes the slave-shaft control circuit 300, a slave-shaft power circuit 301, a power supply 302, and a current detector 303.

The slave-shaft control circuit 300 uses feedback information $i_{slave}$FB on a current that flows through the slave shaft described later, $\theta_{master}$FB, and $\theta_{slave}$FB to calculate a voltage command $V_{slave}^*$ for the voltage to be output to the slave-shaft motor 4. The slave-shaft power circuit 301 converts DC power supplied from the power supply 302, to AC power, and outputs the AC power to the slave-shaft motor 4. The current detector 303 detects a current that flows through the slave-shaft motor 4, and outputs information indicating the detection result to the slave-shaft control circuit 300, as feedback information $i_{slave}$FB on the current that flows through the slave shaft.

Generally, each of the master-shaft power circuit 101 and the slave-shaft power circuit 301 is configured by an inverter that includes switching elements for performing power conversion through PWM (Pulse Width Modulation) control. However, the specific configuration of the master-shaft power circuit 101 and the slave-shaft power circuit 301 is not limited thereto. For example, the master-shaft motor 2, and the slave-shaft motor 4 are three-phase motors. The master-shaft power circuit 101, and the slave-shaft power circuit 301 output three phases of AC power to their corresponding motors. The number of phases of the master-shaft motor 2 and the slave-shaft motor 4 is not limited to this example.

Figure 2:
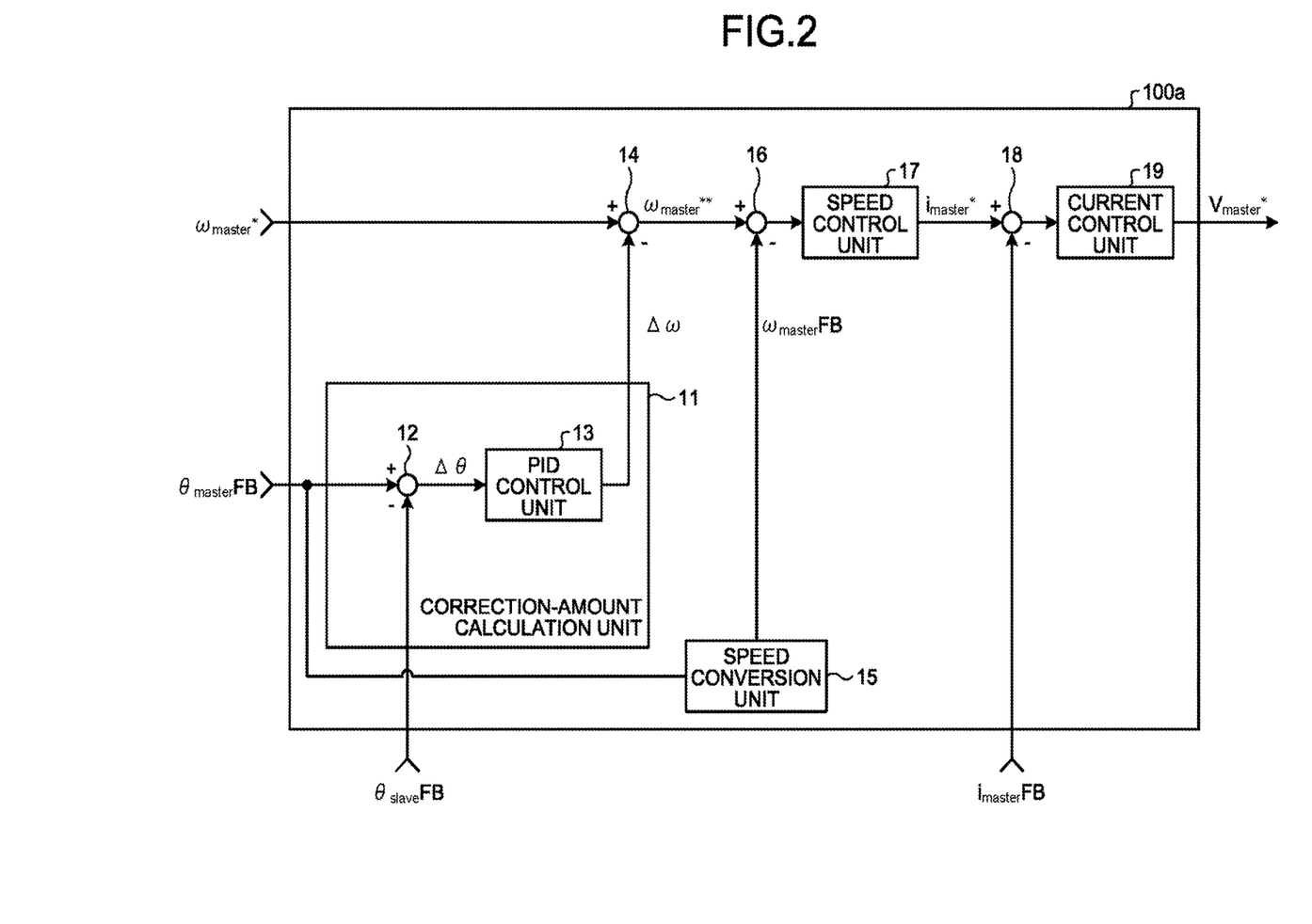
FIG. 2 is a diagram illustrating a configuration example of a master-shaft control circuit illustrated in FIG. 1.

FIG. 2 is a diagram illustrating a configuration example of the master-shaft control circuit 100a illustrated in FIG. 1. As illustrated in FIG. 2, the master-shaft control circuit 100a includes a correction-amount calculation unit 11, subtractors 14, 16, and 18, a speed conversion unit 15, a speed control unit 17, and a current control unit 19. The correction-amount calculation unit 11 calculates a speed-command correction amount $\Delta\omega$ from $\theta_{master}$FB output from the PG 5, and $\theta_{slave}$FB output from the PG 6 such that a difference $\Delta\theta$ between $\theta_{master}$FB and $\theta_{slave}$FB becomes zero.

More specifically, the correction-amount calculation unit 11 includes a subtractor 12, and a PID (Proportional Integral Differential) control unit 13. The subtractor 12 calculates the difference $\Delta\theta$ between $\theta_{master}$FB and $\theta_{slave}$FB, and outputs the calculated difference $\Delta\theta$ to the PID control unit 13. The PID control unit 13 calculates the voltage-command correction amount $\Delta\omega$ by executing PID control such that the $\Delta\theta$ becomes zero.

The speed conversion unit 15 converts $\theta_{master}$FB to $\omega_{master}$FB that is feedback information on the rotational speed of the master-shaft motor 2, and then the speed conversion unit 15 outputs $\omega_{master}$FB to the subtractor 16. Specifically, the speed conversion unit 15 calculates $\omega_{master}$FB by calculating the amount of change in $\theta_{master}$FB per unit time. The subtractor 14 subtracts $\Delta\omega$ from $\omega_{master}^*$ received from the higher-level controller 500, and outputs the result of the subtraction to the subtractor 16, as a corrected speed command $\omega_{master}^{**}$.

The subtractor 16 calculates the difference between $\omega_{master}^{**}$ and $\omega_{master}$FB, and outputs the calculated difference to the speed control unit 17. The speed control unit 17 determines a torque current command $i_{master}^*$ that corresponds to the master-shaft motor 2 such that the difference between $\omega_{master}^{}$ and $\omega_{master}FB$ becomes zero. Specifically, the speed control unit 17** determines the $i_{master}^{*}$ by executing PI (Proportional Integral) control, for example.

The subtractor 18 calculates the difference between $i_{master}^{*}$ and $i_{master}FB$, and outputs the calculated difference to the current control unit 19. The current control unit 19 determines a voltage command $V_{master}^{*}$ that corresponds to the master-shaft motor 2 such that the difference between $i_{master}^{*}$ and $i_{master}FB$ becomes zero, and then the current control unit 19 outputs the voltage command $V_{master}^{*}$ to the master-shaft power circuit 101. Specifically, the current control unit 19 determines $V_{master}^{*}$ by executing PI control, for example.

As described above, the correction-amount calculation unit 11 uses $\theta_{master}FB$ that is the detection result of the position of the master-shaft motor 2, and $\theta_{slave}FB$ that is the detection result of the position of the slave-shaft motor 4, to calculate the correction amount for correcting the speed command which is an example of a command that is to be used for controlling the master-shaft motor 2. The subtractor 14 is a correction unit that uses the correction amount to correct the command that is to be used for controlling the master-shaft motor 2.

Figure 3:
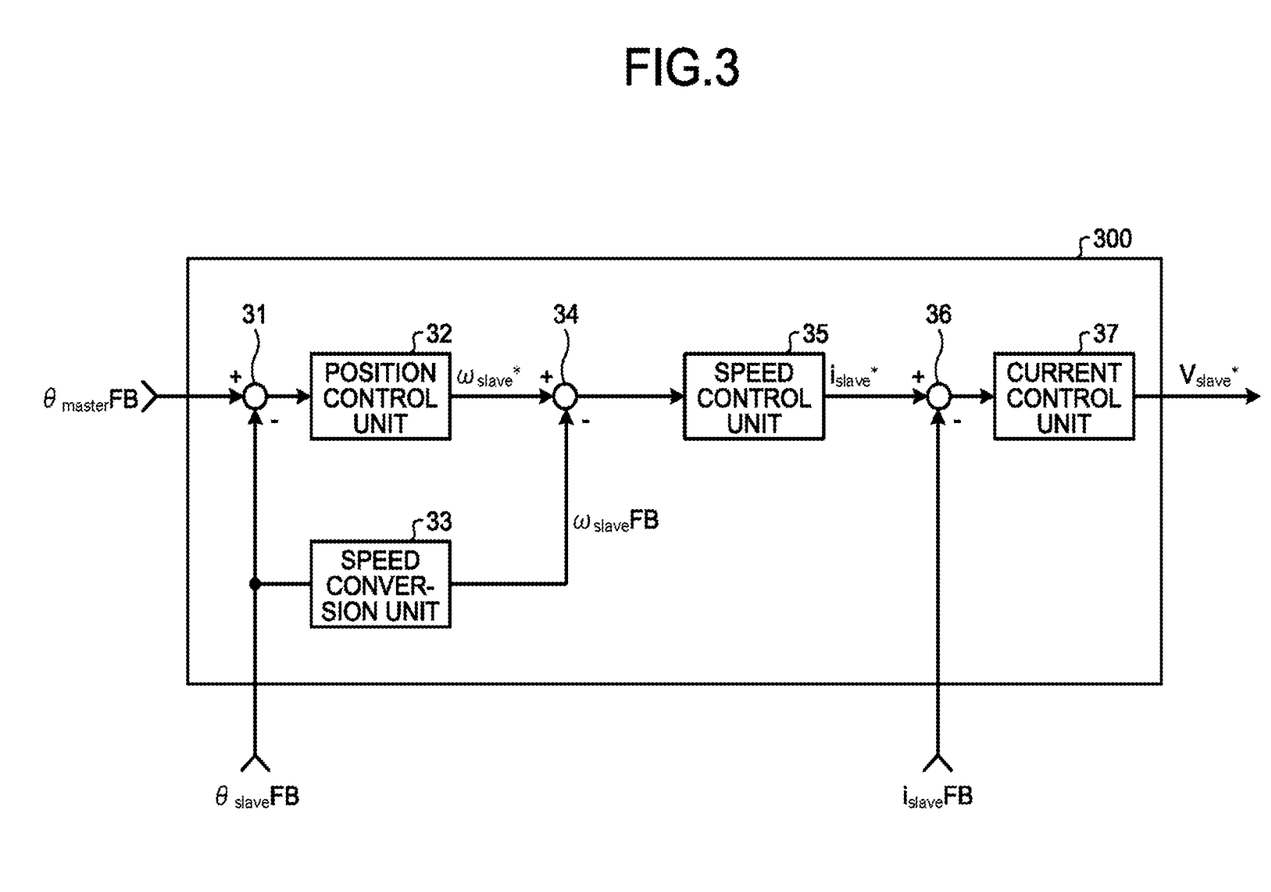
FIG. 3 is a diagram illustrating a configuration example of a slave-shaft control circuit illustrated in FIG. 1.

FIG. 3 is a diagram illustrating a configuration example of the slave-shaft control circuit 300 illustrated in FIG. 1. As illustrated in FIG. 3, the slave-shaft control circuit 300 includes subtractors 31, 34, and 36, a position control unit 32, a speed conversion unit 33, a speed control unit 35, and a current control unit 37.

The subtractor 31 calculates the difference $\Delta\theta$ between $\theta_{master}FB$ and $\theta_{slave}FB$, and outputs the calculated difference $\Delta\theta$ to the position control unit 32. The position control unit 32 determines a voltage command $\omega_{slave}^{*}$ that corresponds to the slave-shaft motor 4 such that the $\Delta\theta$ becomes zero, and then the position control unit 32 outputs the voltage command $\omega_{slave}^{*}$ to the subtractor 34. In this manner, the slave-shaft control circuit 300 executes position control such that the difference between $\theta_{master}FB$ and $\theta_{slave}FB$ becomes zero. That is, the slave-shaft control circuit 300 uses $\theta_{master}FB$ as a position command.

The speed conversion unit 33 converts $\theta_{slave}FB$ to $\omega_{slave}FB$ that is feedback information on the rotational speed of the slave-shaft motor 4, and then the speed conversion unit 33 outputs the $\omega_{slave}FB$ to the subtractor 34. Specifically, the speed conversion unit 33 calculates $\omega_{slave}FB$ by calculating the amount of change in $\theta_{slave}FB$ per unit time.

The subtractor 34 outputs the difference between $\omega_{slave}^{*}$ and $\omega_{slave}FB$ to the speed control unit 35. The speed control unit 35 determines a torque current command $i_{slave}^{*}$ that corresponds to the slave-shaft motor 4 such that the difference between $\omega_{slave}^{*}$ and $\omega_{slave}FB$ becomes zero. Specifically, the speed control unit 35 determines $i_{slave}^{*}$ by executing PI control, for example.

The subtractor 36 calculates the difference between $i_{slave}^{*}$ and $i_{slave}FB$, and outputs the calculated difference to the current control unit 37. The current control unit 37 determines a voltage command $V_{slave}^{*}$ that corresponds to the slave-shaft motor 4 such that the difference between $i_{slave}^{*}$ and $i_{slave}FB$ becomes zero, and then the current control unit 37 outputs $V_{slave}^{*}$ to the slave-shaft power circuit 301. Specifically, the current control unit 37 determines $V_{slave}^{*}$ by executing PI control, for example.

Next, an operation and effects of the correction-amount calculation unit 11 in the present embodiment are described. The motor control device 10a in the present embodiment controls the rotational speed of the master-shaft motor 2 and the rotational speed of the slave-shaft motor 4 so as to be synchronized with each other on the basis of the speed command $\omega_{master}^{*}$. The slave-shaft control circuit 300 uses $\theta_{master}FB$ as a position command in order to synchronize the rotational speed of the slave-shaft motor 4 with the rotational speed of the master-shaft motor 2. The motor control device 10a executes the control as described above, that is, the control that uses the position feedback information on the master shaft as a speed command for the slave shaft. As a result, the motor control device 10a can achieve synchronous control between the master-shaft motor 2 and the slave-shaft motor 4 provided that torque saturation does not occur in the master-shaft motor 2 and the slave-shaft motor 4. Even when the torque saturation occurs in at least one of the master-shaft motor 2 and the slave-shaft motor 4, that is, even in a state of high-torque operation, the motor control device 10a can still achieve the synchronous control between the master-shaft motor 2 and the slave-shaft motor 4 provided that the torque saturation occurs in the master-shaft motor 2 while the torque saturation does not occur in the slave-shaft motor 4.

Meanwhile, in the state of high-torque operation in which the torque saturation does not occur in the master-shaft motor 2 while the torque saturation occurs in the slave-shaft motor 4, the motor control device 10a may not be able to maintain synchronous control solely by using the position feedback information on the master shaft as a speed command for the slave shaft. Therefore, in the present embodiment, the correction-amount calculation unit 11 uses both $\theta_{master}FB$ and $\theta_{slave}FB$ to calculate the correction amount $\Delta\omega$ for the speed of the master-shaft motor 2 such that there is no difference between $\theta_{master}FB$ and $\theta_{slave}FB$. The subtractor 14 then subtracts $\Delta\omega$ from $\omega_{master}^{*}$. The speed control unit 17 uses $\omega_{master}^{**}$, which is a value obtained by subtracting $\Delta\omega$ from $\omega_{master}^{*}$, as a speed command to execute the speed control.

As described above, the master-shaft control circuit 100a corrects the speed command such that there is no difference between $\theta_{master}FB$ and $\theta_{slave}FB$. For example, when a phenomenon in which the rotation of the slave-shaft motor 4 lags behind the rotation of the master-shaft motor 2 occurs, the master-shaft control circuit 100a automatically decreases the speed-command value, and therefore can eliminate the difference between the shafts. Due to this correction, the motor control device 10a can eliminate the difference between the shafts, and still maintain the synchronous control between the shafts even under the condition that the torque saturation does not occur in the master-shaft motor 2 while the torque saturation occurs in the slave-shaft motor 4.

Specifically, when an upper-limit value of an allowable torque for the slave-shaft motor 4 is smaller than an upper-limit value of an allowable torque for the master-shaft motor 2, for example, there is the possibility of the occurrence of the aforementioned state, that is, there is the possibility that the torque saturation does not occur in the master-shaft motor 2 while the torque saturation occurs in the slave-shaft motor 4.

Figure 4:
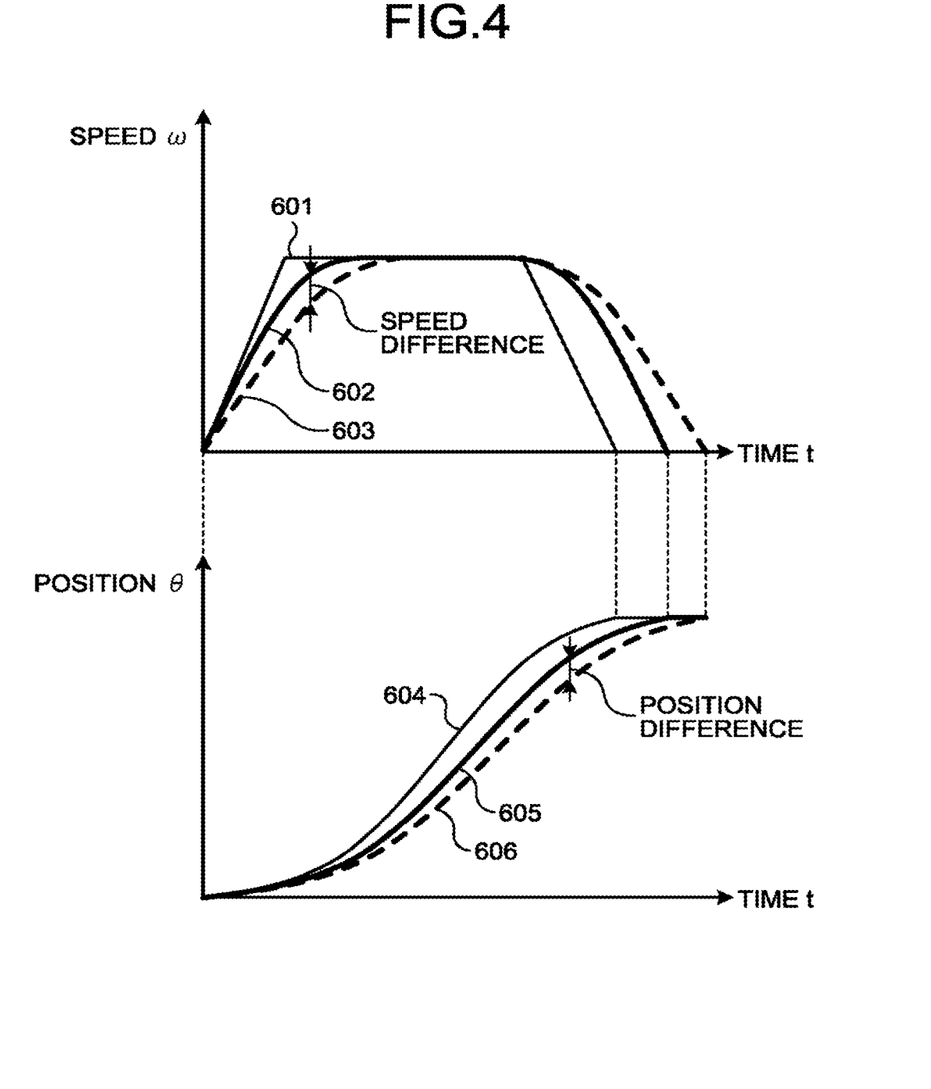
FIG. 4 is a schematic diagram illustrating a speed and a position in a case where a correction-amount calculation unit in the first embodiment is not provided.
Figure 5:
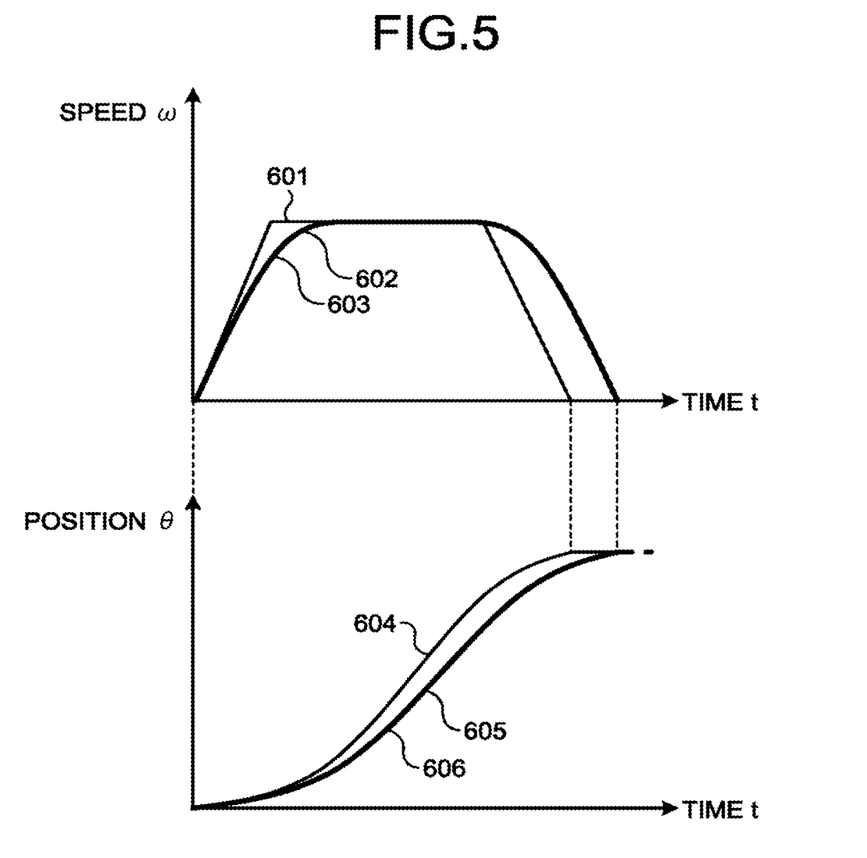
FIG. 5 is a schematic diagram illustrating a speed and a position in a case where the correction-amount calculation unit in the first embodiment is provided.

FIG. 4 is a schematic diagram illustrating a speed and a position of each motor in a case where the correction-amount calculation unit 11 in the first embodiment is not provided. That is, FIG. 4 is the schematic diagram illustrating the speed and the position of each motor in a case where the speed control unit 17 uses $\omega_{master}^{*}$ input from the higher-level controller 500, as a speed command. FIG. 5 is a schematic diagram illustrating a speed and a position of each motor in a case where the correction-amount calculation unit 11 in the first embodiment is provided. FIG. 4 and FIG. 5 both illustrate the speed and the position of each motor when the torque saturation does not occur in the master-shaft motor 2 while the torque saturation occurs in the slave-shaft motor 4. FIG. 4 and FIG. 5 both illustrate the speed command, and the speed of each motor in the upper section, while illustrating the position command, and the position of each motor in the lower section. A speed command 601 illustrates a speed command to be input to the speed control unit 17. A master-shaft speed 602 illustrates the speed of the master-shaft motor 2. A slave-shaft speed 603 illustrates the speed of the slave-shaft motor 4. A position command 604 illustrates a position command to be input to the position control unit 32. A master-shaft position 605 illustrates the position of the master-shaft motor 2. A slave-shaft position 606 illustrates the position of the slave-shaft motor 4.

In the case where the correction-amount calculation unit 11 is not provided, when the torque saturation does not occurred in the master-shaft motor 2 while the torque saturation has occurred in the slave-shaft motor 4, the slave-shaft motor 4 fail to follow the master-shaft motor 2 as illustrated in FIG. 4. This causes a speed difference and a position difference therebetween. In contrast, in the case where the correction-amount calculation unit 11 is provided, when the slave-shaft motor 4 fail to follow the master-shaft motor 2, the speed command is corrected so as to delay the master-shaft motor 2 by the amount of delay of the slave-shaft motor 4. As a result, the speed difference and the position difference therebetween are minimized as illustrated in FIG. 5.

Even when no torque saturation occurs but disturbance that causes an increase in the rotational speed of the master-shaft motor 2 occurs, the value of a speed command for the master shaft is still increased, and the operation of the slave shaft that follows the master shaft also becomes faster automatically in accordance with the configuration and the operation of the motor control device 10a in the present embodiment. The synchronization between the master shaft and the slave shaft can thus be maintained.

In the present embodiment, the correction-amount calculation unit 11 calculates the correction amount by executing the PID control. Alternatively, the correction-amount calculation unit 11 may calculate the correction amount by executing the PI control or the PD (Proportional Differential) control. Further, the speed control unit 17, the current control unit 19, the position control unit 32, the speed control unit 35, and the current control unit 37 may individually execute the PD control or the PID control.

A hardware configuration of the master-shaft control circuit 100a, and the slave-shaft control circuit 300 is described below. The respective units that constitute the master-shaft control circuit 100a and the slave-shaft control circuit 300 are implemented by a processing circuit. The processing circuit may be an analog circuit, a circuit that is configured as dedicated hardware, or a control circuit that includes a processor. When the processing circuit is the analog circuit, the respective units of the circuit are configured by, for example, a resistance, an operational amplifier, and the like.

The processing circuit may also be configured as an ASIC (Application Specific Integrated Circuit), an FPGA (Field Programmable Gate Array), or dedicated hardware that combines the ASIC and the FPGA.

Figure 6:
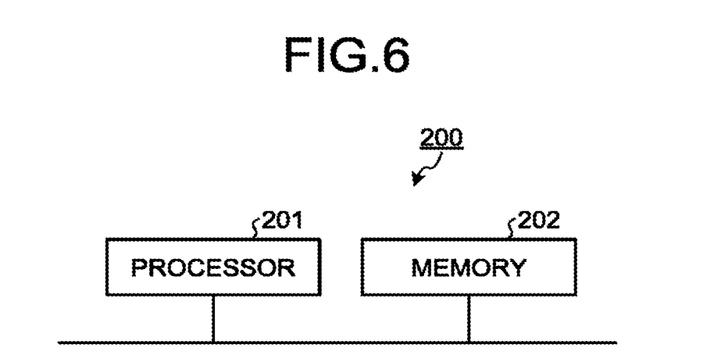
FIG. 6 is a diagram illustrating a configuration example of a control circuit according to the first embodiment.

In the case where the processing circuit is implemented by the control circuit that includes the processor, this control circuit is, for example, a control circuit 200 that is configured as illustrated in FIG. 6. FIG. 6 is a diagram illustrating a configuration example of the control circuit 200 in the present embodiment. The control circuit 200 includes a processor 201 and a memory 202. The processor 201 is, for example, a CPU (Central Processing Unit, which is also referred to as "processing device", "computing device", "microprocessor", "microcomputer", "processor", or "DSP (Digital Signal Processor)"). The memory 202 is, for example, a nonvolatile or volatile semiconductor memory such as a RAM (Random Access Memory), a ROM (Read Only Memory), a flash memory, an EPROM (Erasable Programmable Read Only Memory), or an EEPROM (Electrically Erasable Programmable Read Only Memory), or is a magnetic disc.

In the case where the processing circuit is the control circuit 200 that includes the processor 201, the individual constituent units of the master-shaft control circuit 100a and the slave-shaft control circuit 300 are implemented by the processor 201 reading and executing a program that is stored in the memory 202 and describes the process of each constituent unit. The memory 202 is used also as a temporary memory for the processor 201 to perform each process.

It is to be understood that two or more of the circuits, which are the analog circuit, the processing circuit that is dedicated hardware, and the control circuit 200 may be combined together. For example, a part of the master-shaft control circuit 100a and the slave-shaft control circuit 300 is implemented by an analog circuit, while the other part of these control circuits 100a and 300 is implemented by the control circuit 200.

As described above, in the present embodiment, the correction-amount calculation unit 11 calculates the correction amount $\Delta\omega$ for the speed of the master-shaft motor 2 such that there is no difference between $\theta_{master}$FB and $\theta_{slave}$FB. The subtractor 14 then subtracts $\Delta\omega$ from the $\omega_{master}*$ to correct the speed command. Therefore, even during the high-torque operation, the motor control device 10a can still maintain the synchronization between the drive shafts.

Second Embodiment.

Figure 7:
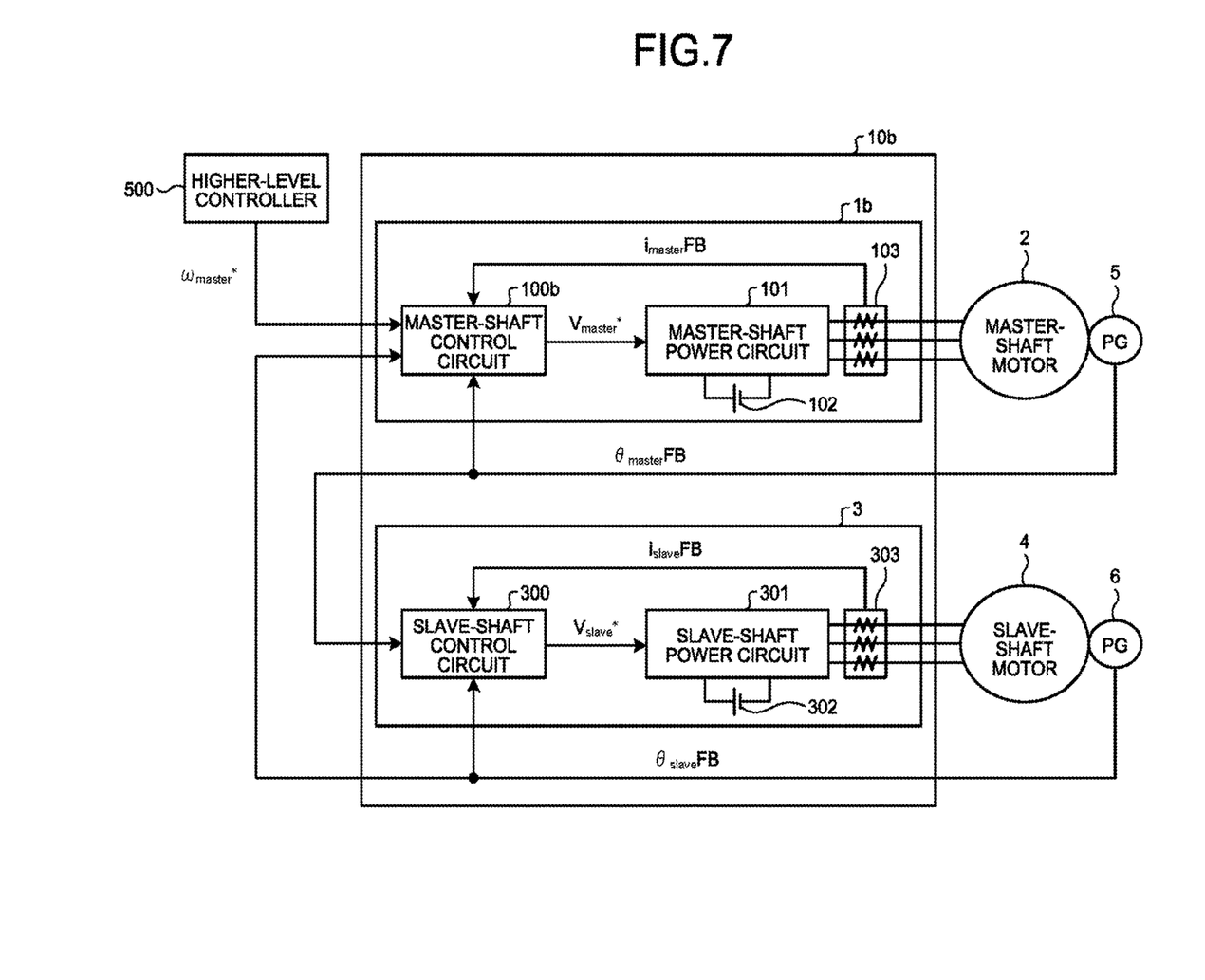
FIG. 7 is a diagram illustrating a configuration example of a motor control device according to a second embodiment.

FIG. 7 is a diagram illustrating a configuration example of a motor control device according to a second embodiment. A motor control device 10b illustrated in FIG. 7 is used in an apparatus that includes two drive shafts, which are the master shaft and the slave shaft. In FIG. 7, the master-shaft motor 2 and the slave-shaft motor 4, both of which are driven by the motor control device 10b, are also illustrated along with the motor control device 10b. In FIG. 7, the PG 5, the PG 6, and the higher-level controller 500 are further illustrated along with the motor control device 10b. Constituent elements having identical functions as those of the first embodiment are denoted by like reference signs as those in the first embodiment and the redundant explanations are omitted.

In the first embodiment, the example has been described in which the speed command is corrected. In the present embodiment, an example is described in which a torque current command is corrected. In the case of correcting the torque current command, the same effects as those in the first embodiment can also be obtained.

The motor control device 10b in the present embodiment is identical to the motor control device 10a in the first embodiment, except that the motor control device 10b includes a master-shaft drive device 1b instead of the master-shaft drive device 1a in the first embodiment. The master-shaft drive device 1b is identical to the master-shaft drive device 1a in the first embodiment, except that the master-shaft drive device 1b includes a master-shaft control circuit 100b instead of the master-shaft control circuit 100a.

Figure 8:
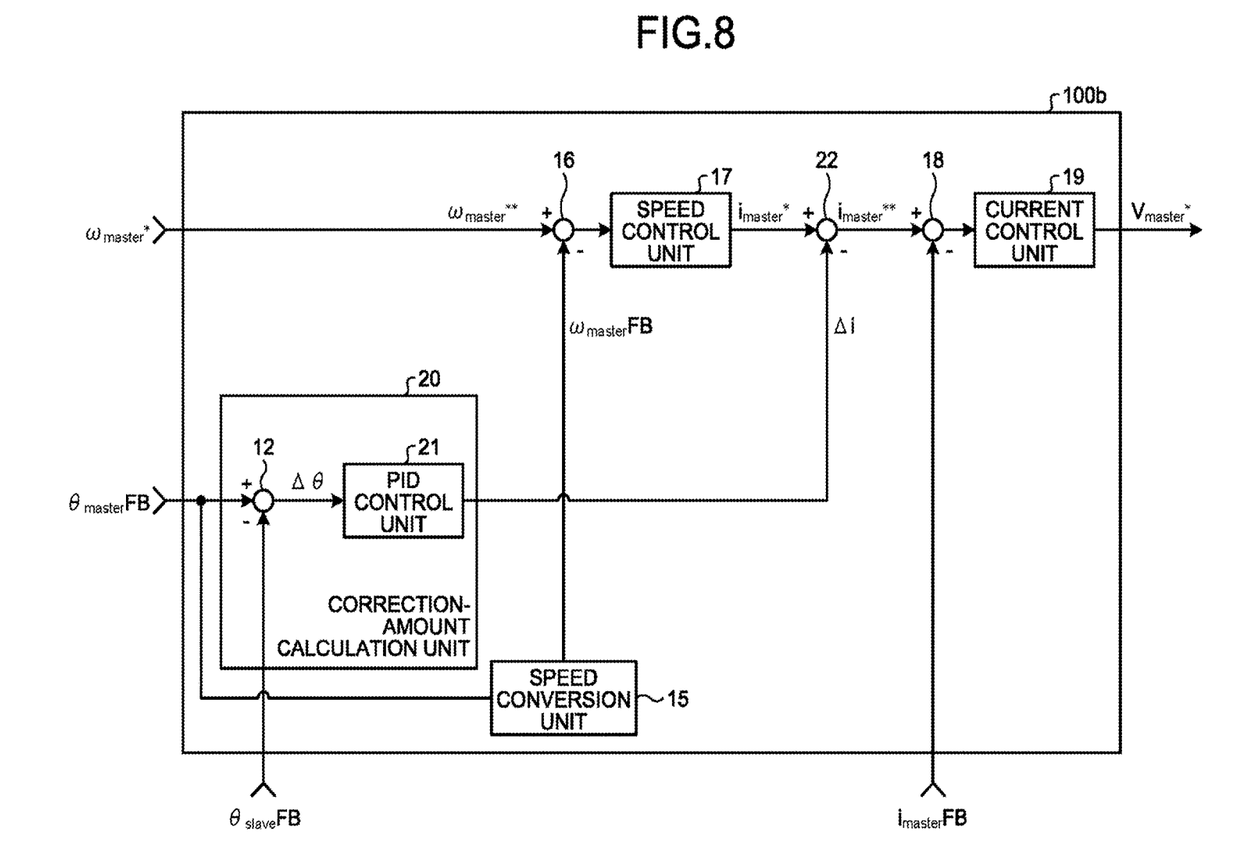
FIG. 8 is a diagram illustrating a configuration example of a master-shaft control circuit in the second embodiment.

FIG. 8 is a diagram illustrating a configuration example of the master-shaft control circuit 100b in the present embodiment. As illustrated in FIG. 8, the master-shaft control circuit 100b includes subtractors 16, 18, and 22, the speed conversion unit 15, the speed control unit 17, the current control unit 19, and a correction-amount calculation unit 20. The correction-amount calculation unit 20 includes the subtractor 12, and a PID control unit 21.

The PID control unit 21 calculates a correction amount Δi for a current that flows through the master-shaft motor 2 such that the difference Δθ between $\theta_{master}$FB and $\theta_{slave}$FB, which is output from the subtractor 12, becomes zero. The PID control unit 21 then outputs the correction amount Δi to the subtractor 22. The subtractor 22 subtracts the Δi from $i_{master}*$ that is a torque current command output from the speed control unit 17, and then the subtractor 22 outputs the result of the subtraction as $i_{master}$ to the current control unit 19. The current control unit 19 uses $i_{master}$ as a torque current command to calculate $V_{master}*$ such that the difference between the torque current command and $i_{master}$FB becomes zero, and then the current control unit 19 outputs $V_{master}*$ to the master-shaft power circuit 101 in the same manner as in the first embodiment.

In the present embodiment, the difference between $\omega_{master}**$ and $\omega_{master}$FB that is output from the speed conversion unit 15 is input to the speed control unit 17. Therefore, the speed control unit 17 uses $\omega_{master}*$ which has been output from the higher-level controller 500, as a speed command to execute the speed control. Meanwhile, the current control unit 19 executes the current control by using the torque current command which has been corrected by using the correction amount calculated such that the difference between $\theta_{master}$FB and $\theta_{slave}$FB becomes zero, as described above.

As described above, the correction-amount calculation unit 20 uses $\theta_{master}$FB that is the detection result of the position of the master-shaft motor 2, and $\theta_{slave}$FB that is the detection result of the position of the slave-shaft motor 4, to calculate the correction amount for correcting the current command which is an example of the command that is to be used for controlling the master-shaft motor 2. The subtractor 22 is a correction unit that uses the correction amount, to correct the current command that is to be used for controlling the master-shaft motor 2.

As described above, the master-shaft control circuit 100b in the present embodiment corrects the torque current command instead of correcting the speed command, and therefore can achieve the same effects as those in the first embodiment.

A hardware configuration of the correction-amount calculation unit 20 and the subtractor 22 in the present embodiment is implemented by a processing circuit similarly to the respective constituent units described in the first embodiment. As described in the first embodiment, the processing circuit may be any of an analog circuit, a processing circuit that is dedicated hardware, and the control circuit 200, or a combination of two or more of these circuits.

Third Embodiment.

Figure 9:
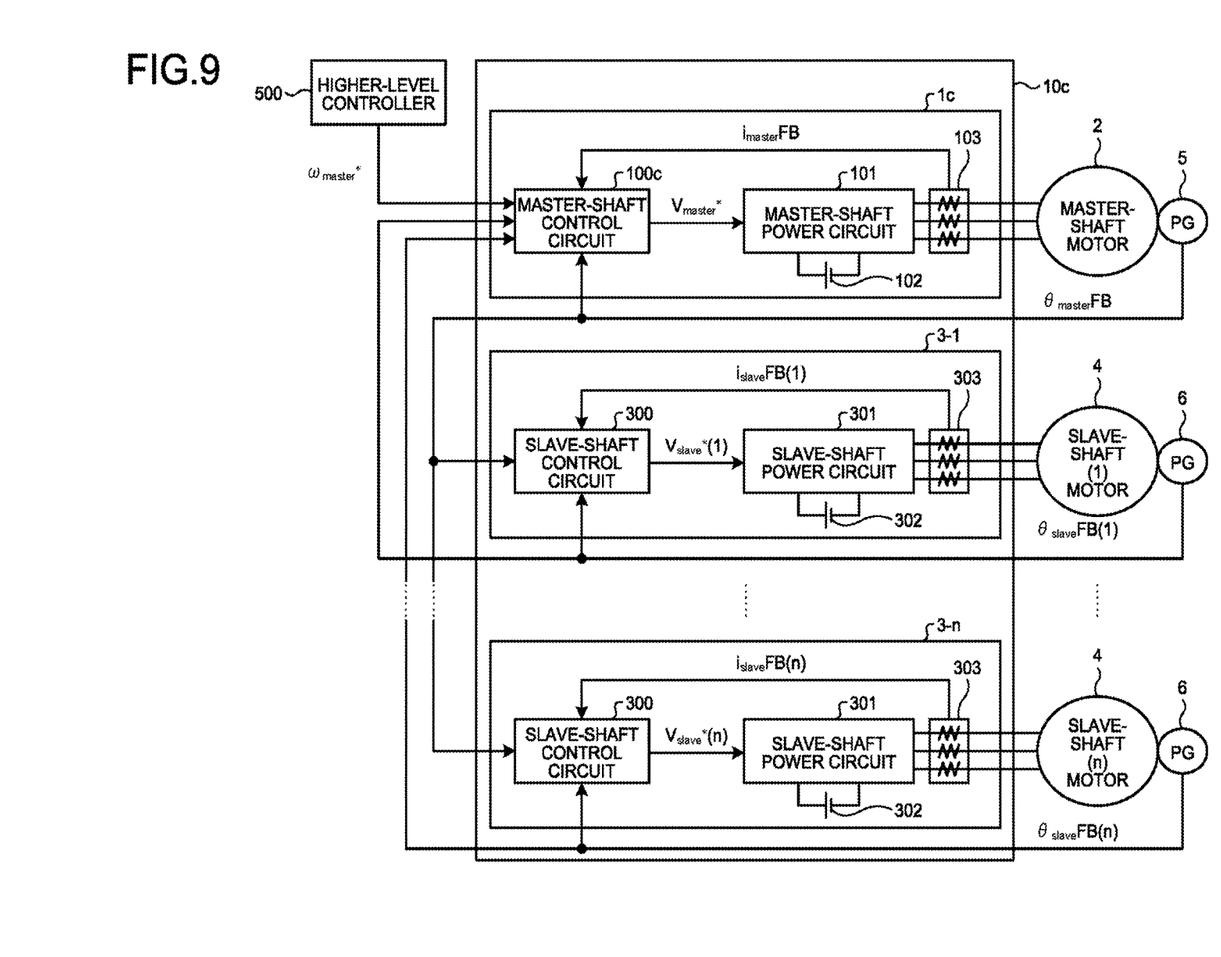
FIG. 9 is a diagram illustrating a configuration example of a motor control device according to a third embodiment.

FIG. 9 is a diagram illustrating a configuration example of a motor control device according to a third embodiment. A motor control device 10c illustrated in FIG. 9 is used in an apparatus that includes a master shaft, and a plurality of slave shafts. In FIG. 9, the master-shaft motor 2 and a plurality of slave-shaft motors 4, all of which are driven by the motor control device 10c, are also illustrated along with the motor control device 10c. In the example illustrated in FIG. 9, "n" is an integer equal to or larger than 2, and the number of slave-shaft motors 4 is an "n". In FIG. 9, the PG 5, a plurality of PGs 6 that detect the respective positions of the slave-shaft motors 4, and the higher-level controller 500 are further illustrated along with the motor control device 10c. Constituent elements having identical functions as those of the first embodiment are denoted by like reference signs as those in the first embodiment and the redundant explanations are omitted.

Although the first and second embodiments have been described in the case where the drive shafts are the two drive shafts, the present invention is applicable to a case where the drive shafts are three or more drive shafts.

As illustrated in FIG. 9, the motor control device 10c in the present embodiment includes a master-shaft drive device 1c that controls the master-shaft motor 2, and slave-shaft drive devices 3-1 to 3-n that correspond respectively to the "n" slave-shaft motors 4. A configuration of each of the slave-shaft drive devices 3-1 to 3-n is identical to that of the slave-shaft drive device 3 in the first and second embodiments. However, different information is input to the slave-shaft drive devices 3-1 to 3-n in the present embodiment, and thus, a sub-number is added to the reference signs of the slave-shaft drive devices in the present embodiment to distinguish from those in the first and second embodiments.

As illustrated in FIG. 9, the PG 6 corresponding to the slave-shaft motor 4 that is controlled by the slave-shaft drive device 3-i measures the position, that is, rotational angle of this slave-shaft motor 4, and feedback information on the measured position, that is, rotational angle is defined as $\theta_{slave}$FB(i) where i=1, . . . , n.

The master-shaft drive device 1c is identical to the master-shaft drive device 1a in the first embodiment, except that the master-shaft drive device 1c includes a master-shaft control circuit 100c instead of the master-shaft control circuit 100a.

Figure 10:
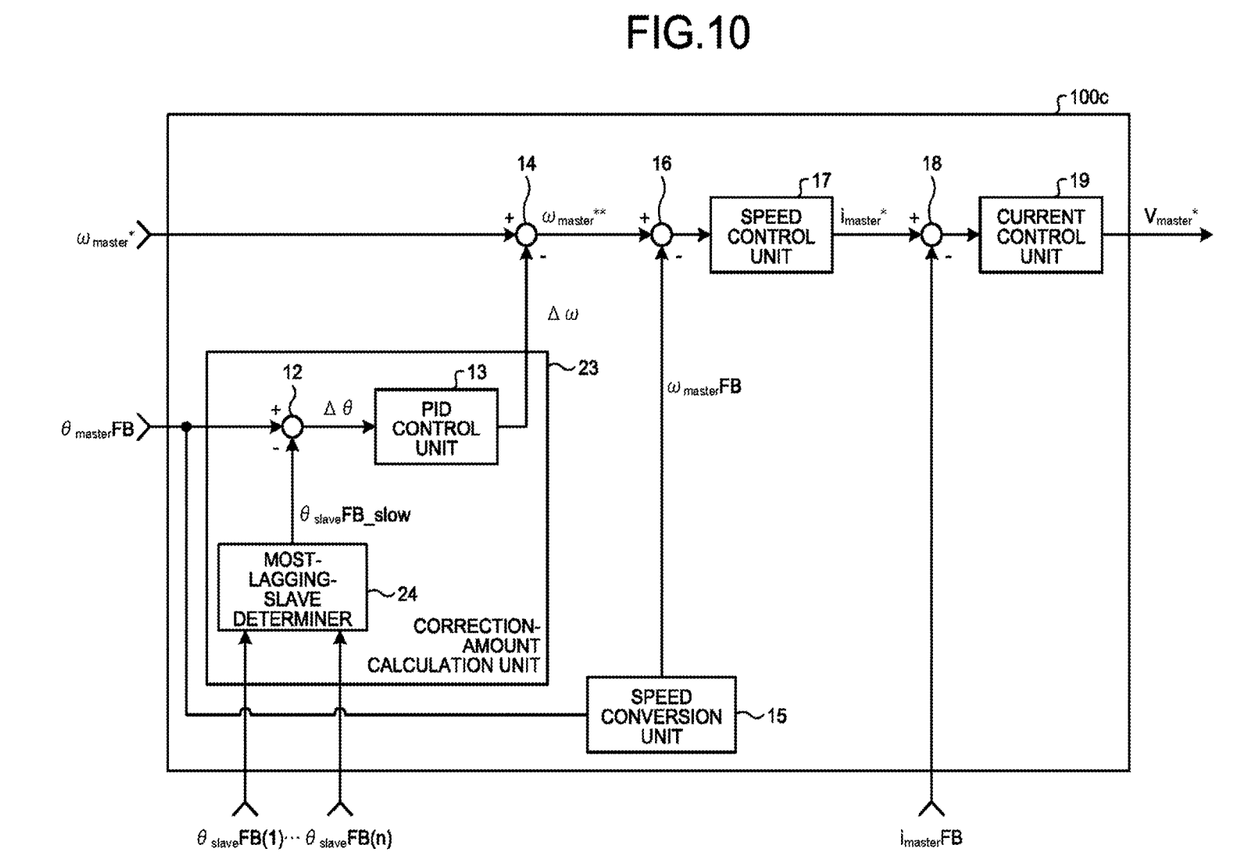
FIG. 10 is a diagram illustrating a configuration example of a master-shaft control circuit in the third embodiment.

FIG. 10 is a diagram illustrating a configuration example of the master-shaft control circuit 100c in the present embodiment. As illustrated in FIG. 10, the master-shaft control circuit 100c is identical to the master-shaft control circuit 100a in the first embodiment, except that the master-shaft control circuit 100c includes a correction-amount calculation unit 23 instead of the correction-amount calculation unit 11.

The correction-amount calculation unit 23 includes the subtractor 12, the PID control unit 13, and a most-lagging-slave determiner 24. The most-lagging-slave determiner 24 selects feedback information indicating the most-lagging-rotation from among the n-pieces of feedback information from $\theta_{slave}$FB(1) to $\theta_{slave}$FB(n), and then outputs the selected feedback information as $\theta_{slave}$FB_slow to the subtractor 12. The feedback information indicating the most-lagging-rotation means the feedback information indicating the smallest rotational-angle. It is noted that when the angles indicated by $\theta_{slave}$FB(1) to $\theta_{slave}$FB(n) vary within the range from an angle below 360° through 360° to an angle above 360°, the most-lagging-slave determiner 24 subtracts 360° from a value smaller than 360° to thereby calculate the smallest rotational angle as a negative value of the angle. For example, where n=3, and $\theta_{slave}$FB(1) indicates 1°, $\theta_{slave}$FB(2) indicates 359°, and the $\theta_{slave}$FB(3) indicates 0°, the $\theta_{slave}$FB(2) is converted to −1° by subtracting 360° from 359°. In this case, the $\theta_{slave}$FB(2) is selected as the $\theta_{slave}$FB_slow. As described above, the correction-amount calculation unit 23 calculates the correction amount such that the difference between the detection result of the position of the master-shaft motor 2 and the detection result of the position of the slave-shaft motor 4 becomes zero.

The subtractor 12 calculates the difference Δθ between $\theta_{master}$FB and $\theta_{slave}$FB_slow, and outputs the calculated difference Δθ to the PID control unit 13 in the same manner as the subtractor 12 in the first embodiment. The PID control unit 13 operates in the same manner as in the first embodiment.

A hardware configuration of the correction-amount calculation unit 23 in the present embodiment is implemented by a processing circuit similarly to the correction-amount calculation unit 11 described in the first embodiment.

As described above, in the present embodiment, a speed command is corrected such that the difference between the position of the master-shaft motor 2 and the position of the most-lagging slave-shaft motor 4 becomes zero. Therefore, in a case where any of the plural slave-shaft motors 4 fails to follow the master-shaft motor 2, the motor control device 10c decreases the speed command for the master-shaft motor 2, and can thereby maintain the synchronization between the master-shaft motor 2 and all the slave-shaft motors 4.

In a case where the disturbance which increases the rotational speed of the master-shaft motor 2 occurs, all the slave-shaft motors 4 need to follow the master-shaft motor 2. Unfortunately, a part of the slave-shaft motors 4 may not be able to follow the master-shaft motor 2 due to the torque saturation. According to the configuration and the operation of the motor control device 10c in the present embodiment, the value of the speed command for the master shaft is changed in synchronization with the slave-shaft motor 4 in which the torque saturation has occurred, without setting individual commands for the respective slave-shaft motors 4. Therefore, the motor control device 10c can maintain the synchronization between the master-shaft motor 2 and all the slave-shaft motors 4.

The above description is made as to the example in which when there are the plurality of the slave-shaft motors 4, a speed command is corrected in the same manner as in the first embodiment. Alternatively, a torque current command may be corrected in the same manner as in the second embodiment. To correct the torque current command, the master-shaft control circuit may include the most-lagging-slave determiner in the correction-amount calculation unit 20 in the second embodiment, such that the most-lagging-slave determiner selects the feedback information indicating the most-lagging-rotation from among the n-pieces of feedback information from the $\theta_{slave}$FB(1) to the $\theta_{slave}$FB(n) and then outputs the selected feedback information as $\theta_{slave}$FB_slow to the subtractor 12.

When the motor control device 10c controls the two or more slave-shaft motors 4, as described above, the motor control device 10c in the present embodiment uses the feedback information on the most-lagging slave-shaft motor 4 to correct the speed command in the same manner as in the first embodiment. Even when the motor control device 10c controls the two or more slave-shaft motors 4, therefore, the motor control device 10c can still maintain the synchronization between the drive shafts.

In the first to third embodiments, the speed control has been described as being executed on the master-shaft motor while the position control has been described as being executed on the slave-shaft motor. Alternatively, the higher-level controller 500 may be designed to output a position command to the master-shaft drive device, and a position control unit may be added at the stage preceding the speed control unit in the master-shaft control circuit of the master-shaft drive device. This added position control unit may calculate a speed command $\omega_{master}$* such that the difference between the position command and $\theta_{master}$FB becomes zero, and accordingly can correct the speed command or correct the torque current command in the same manner as in the first to third embodiments. That is, the command that is to be used for controlling the master-shaft motor 2 may be the position command.

The configurations described in the above embodiments are only examples of the content of the present invention. The configurations can be combined with other well-known techniques, and a part of each configuration can be omitted or modified without departing from the scope of the present invention.

REFERENCE SIGNS LIST 1a, 1b, 1c master-shaft drive device, 2 master-shaft motor, 3, 3-1 to 3-n slave-shaft drive device, 4 slave-shaft motor, 5, 6 PG, 10a, 10b, 10c motor control device, 11, 20, 23 correction-amount calculation unit, 12, 14, 16, 18, 22, 31, 34, 36 subtractor, 13, 21 PID control unit, 15, 33 speed conversion unit, 17, 35 speed control unit, 19, 37 current control unit, 24 most-lagging-slave determiner, 32 position control unit, 100a, 100b, 100c master-shaft control circuit, 101 master-shaft power circuit, 102, 302 power supply, 103, 303 current detector, 300 slave-shaft control circuit, 500 higher-level controller.

The invention claimed is:

1. A motor control device including a first drive device to drive a first motor, and a second drive device to drive a second motor, the motor control device comprising:
   a correction-amount calculator to use a detection result of a position of the first motor, and a detection result of a position of the second motor to calculate a correction amount for correcting a command that is to be used for controlling the first motor;
   a corrector to use the correction amount to correct the command that is to be used for controlling the first motor; and
   a position controller to execute position control on the second motor by using the detection result of the position of the first motor as a position command.

2. The motor control device according to claim 1, wherein the command is a speed command.

3. The motor control device according to claim 1, wherein the command is a torque current command.

4. The motor control device according to claim 1, wherein the second motor is one in number, and
   the correction-amount calculator calculates the correction amount such that a difference between the detection result of the position of the first motor and the detection result of the position of the second motor becomes zero.

5. The motor control device according to claim 1, wherein the second motor is plural in number, and
   the correction-amount calculator selects one of detection results of plural positions corresponding one-to-one to the plural second motors, the selected detection result corresponding to the second motor that is most lagging in rotation, the correction-amount calculator calculating the correction amount such that a difference between the detection result of the position of the first motor and the selected detection result becomes zero.

* * * * *